United States Patent [19]

D'Angelo

[11] 4,327,578
[45] May 4, 1982

[54] DYNAMOMETER

[75] Inventor: Severino D'Angelo, Laguna Beach, Calif.

[73] Assignee: Horiba Instruments Incorporated, Irvine, Calif.

[21] Appl. No.: 105,404

[22] Filed: Dec. 19, 1979

[51] Int. Cl.³ .............................................. G01L 3/22
[52] U.S. Cl. .................................. 73/117; 73/861.18
[58] Field of Search .................. 73/117, 133 R, 134, 73/861.18

[56] References Cited

U.S. PATENT DOCUMENTS

| | | | |
|---|---|---|---|
| 2,982,128 | 5/1961 | Gibson et al. | 73/117 |
| 3,818,754 | 6/1974 | Asmus | 73/134 |
| 3,832,894 | 9/1974 | Pelta | 73/117 |
| 4,161,116 | 7/1979 | Fegraus et al. | 73/117 |

FOREIGN PATENT DOCUMENTS 2012054  7/1979  United Kingdom .................. 73/134

Primary Examiner—Charles A. Ruehl
Attorney, Agent, or Firm—Harness, Dickey & Pierce

[57] ABSTRACT

A dynamometer system for simulating road load and vehicle inertia forces for testing vehicles in place. The system includes a DC motor power absorption unit (PAU) and a microcomputer based system controller for controlling both the road load and inertia forces simulated by the PAU. A non-declutchable flywheel is used to simulate mechanically a constant amount of inertia to minimize the power requirements of the PAU. The control scheme is designed to implement the classic dynamometer control expression ($F=A+Bv+Cv^2+I\,dv/dt$) in a novel manner with a minimum amount of delay time. The microcomputer is provided with the following measured functions: speed, acceleration, and a torque signal. The total force output to be simulated by the PAU is determined by first calculating the actual force output of the vehicle, and then determining the percentage of the total force output that should be assigned to the PAU. In calculating the total force output of the vehicle, the inertia outside the torque loop is accurately accounted for, thus permitting the torque transducer to be placed adjacent the PAU. In addition, the force output control signal applied to the PAU is corrected by an inertia error function to insure that the actual inertia force simulated by the PAU corresponds to the desired inertia value. A novel method of accurately converting the frequency signal from the speed sensor to a parallel digital signal without introducing an excessive time delay is also disclosed.

14 Claims, 10 Drawing Figures

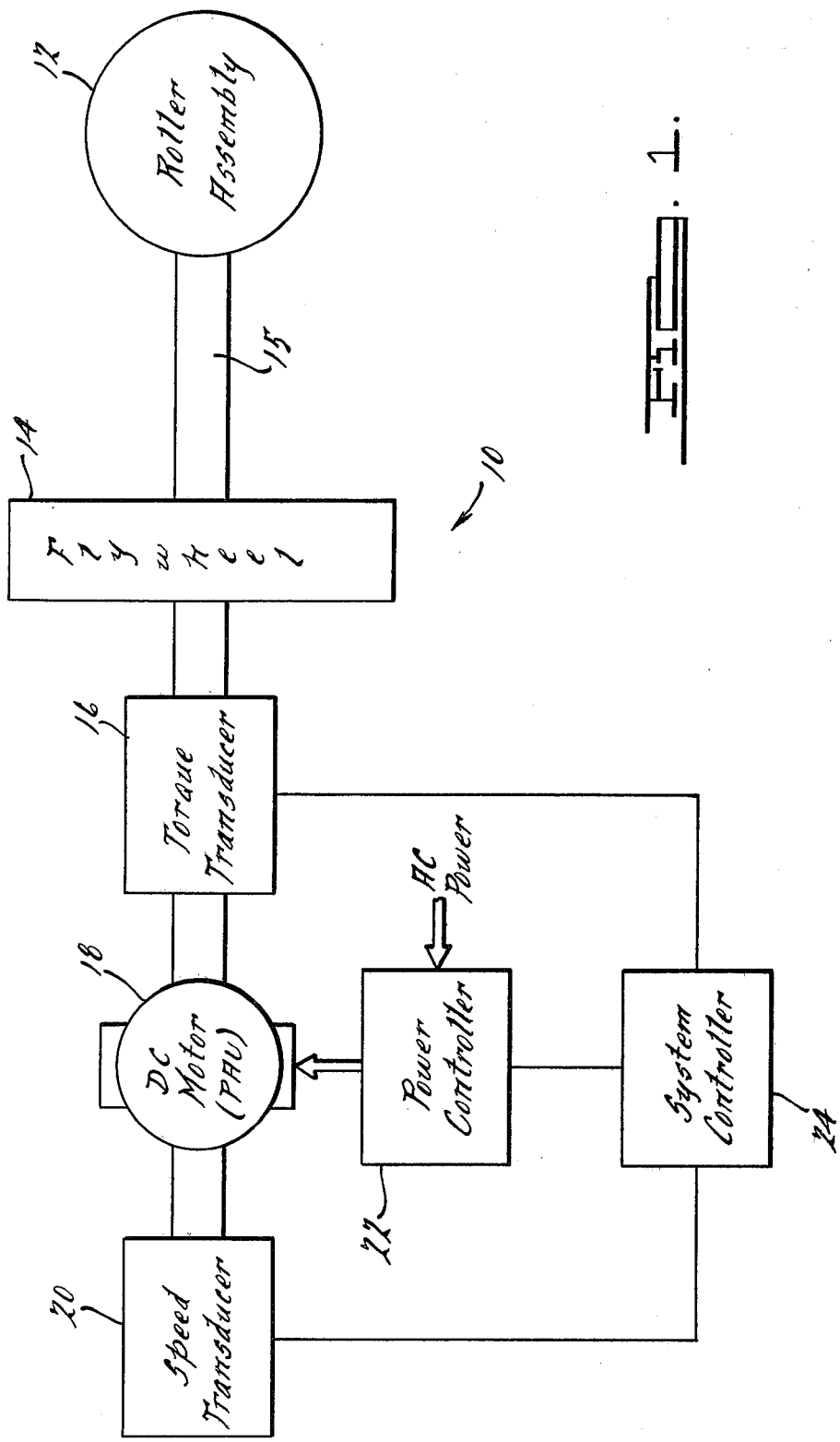

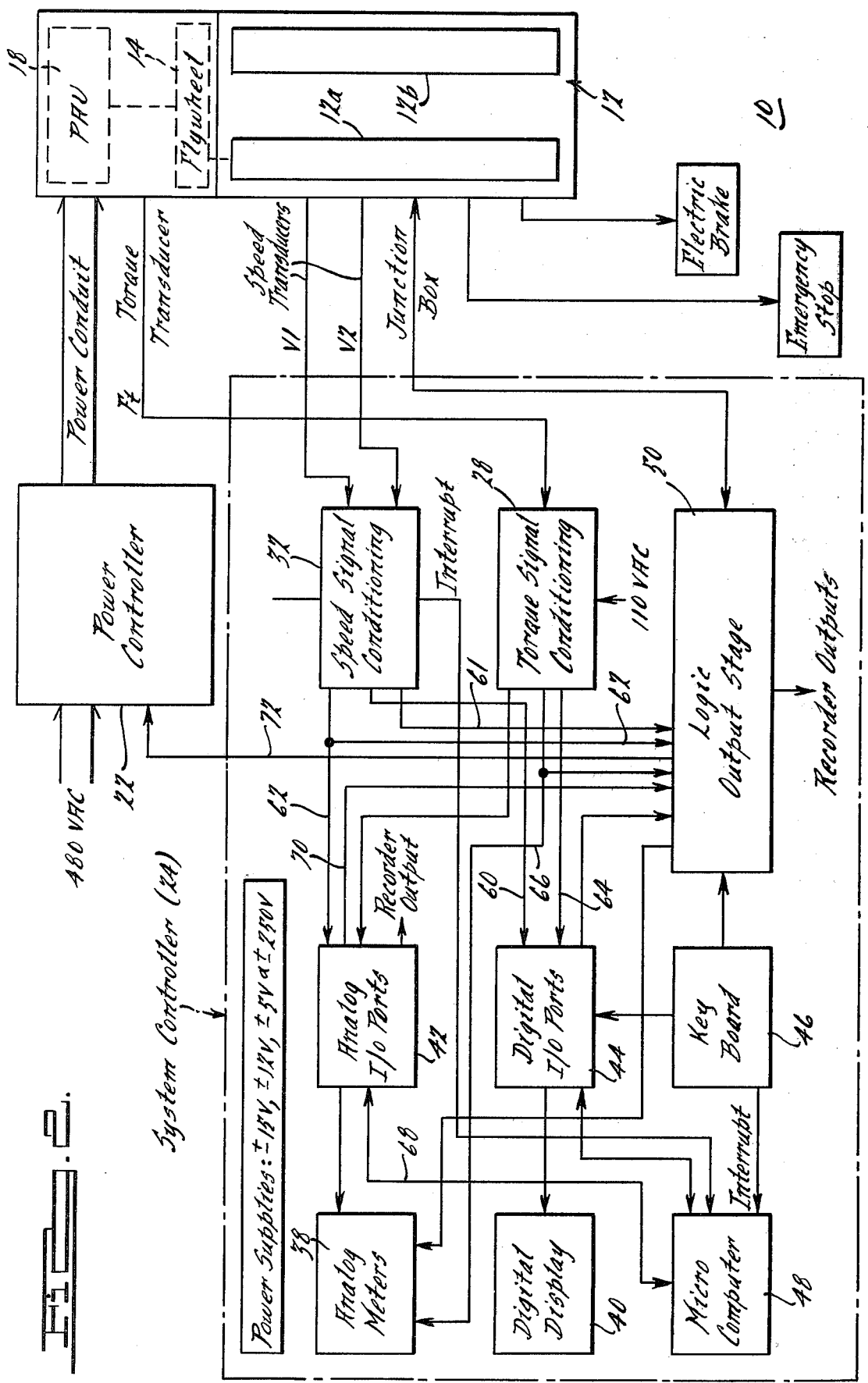

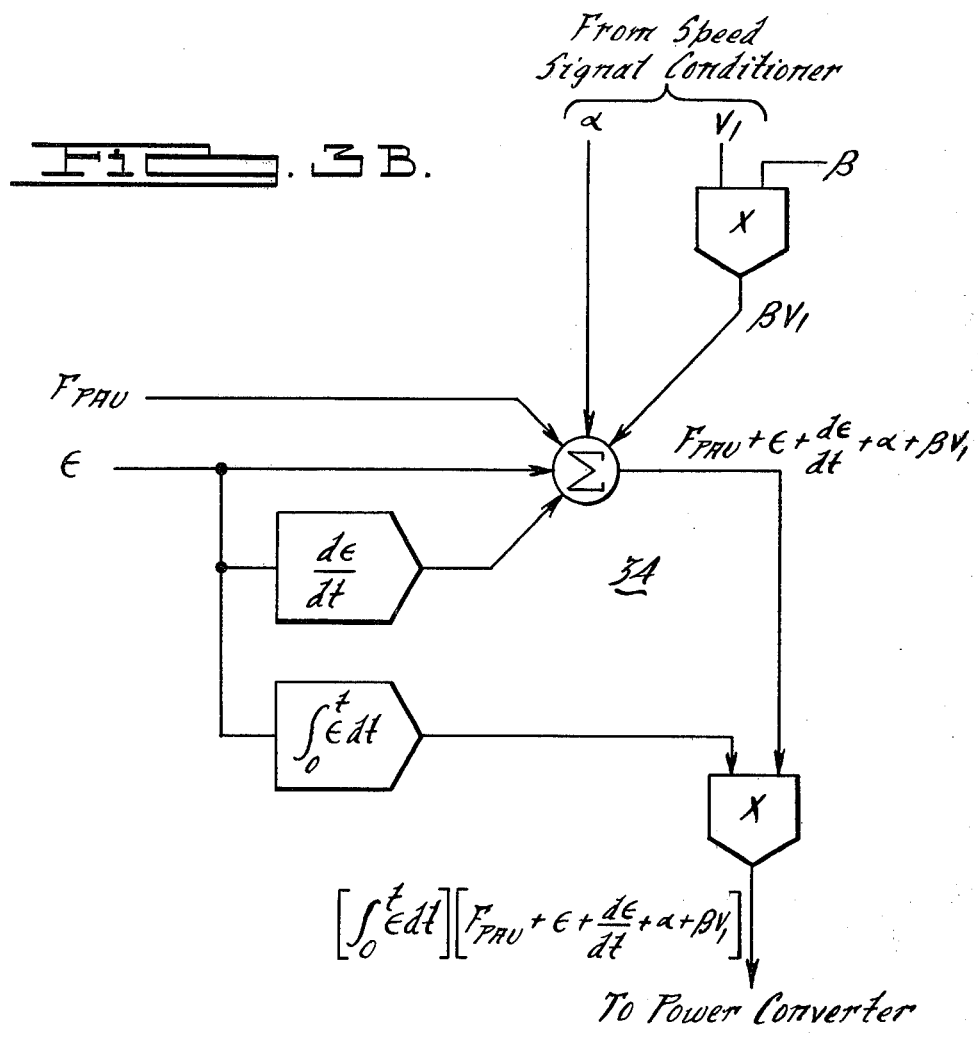

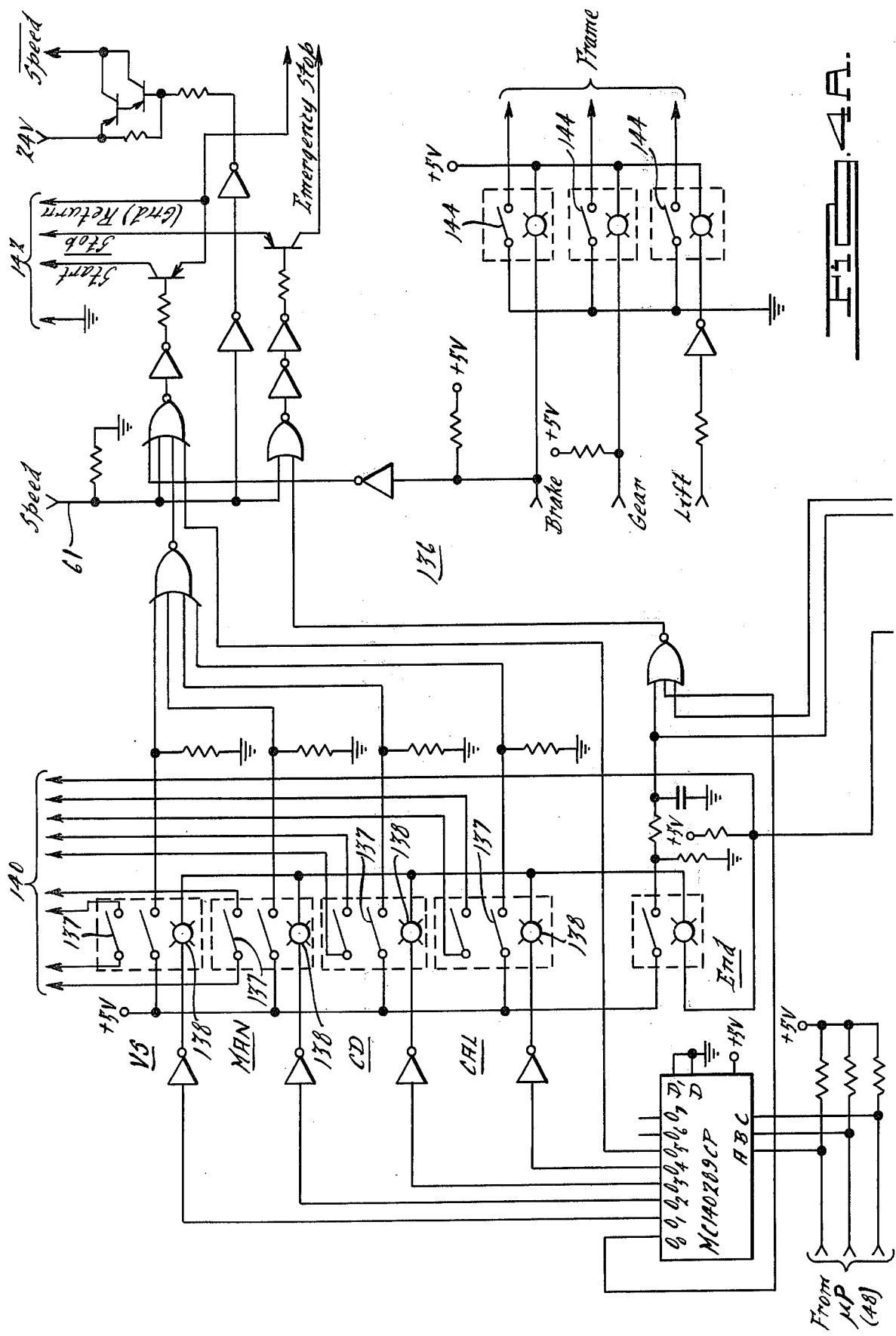

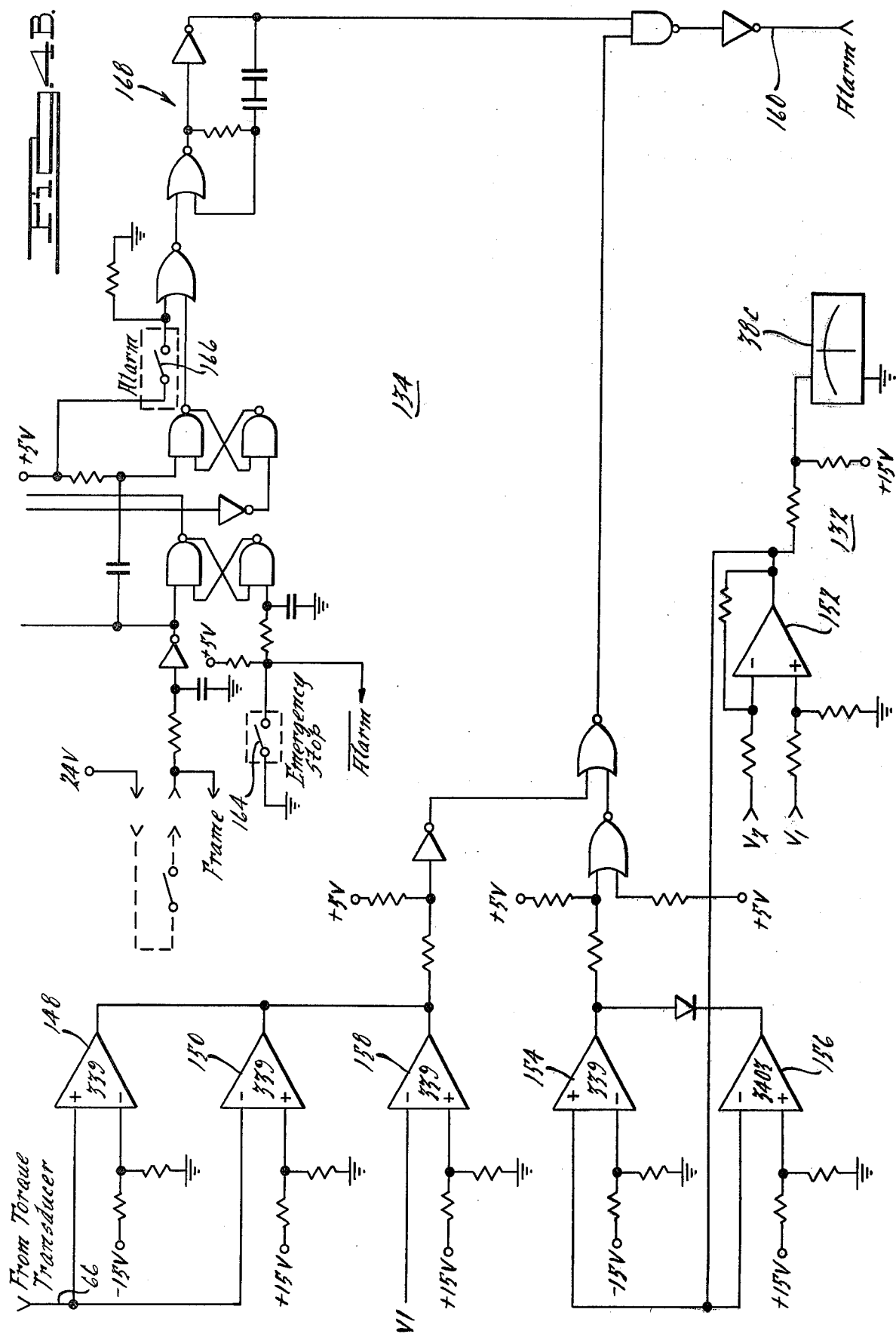

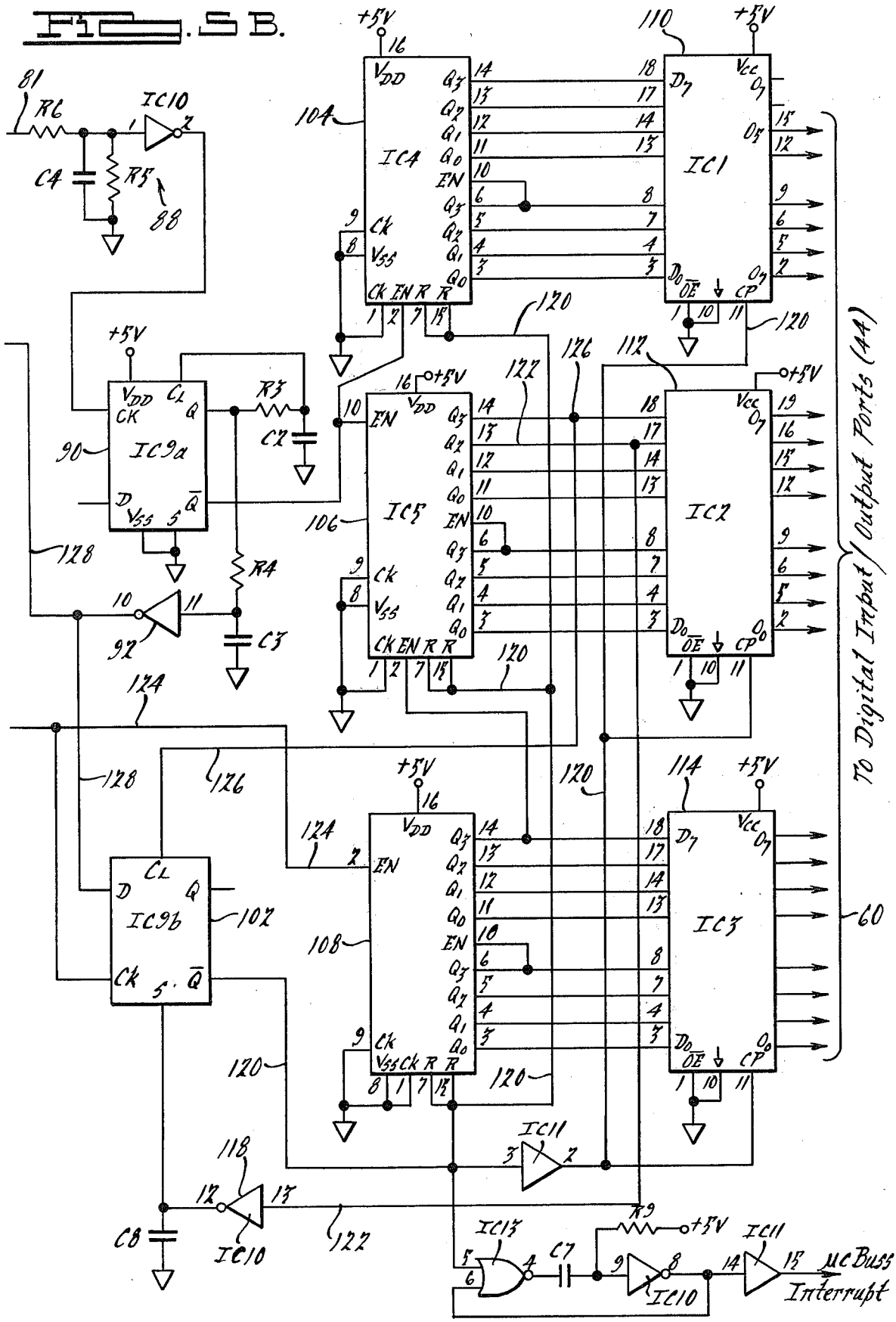

DYNAMOMETER

BACKGROUND AND SUMMARY OF THE INVENTION

The present invention relates to dynamometers and in particular to electromechanical devices for simulating road load and vehicle inertia forces for testing vehicles in place.

Vehicle dynamometers are used primarily for two purposes; as measuring devices for determining the torque and/or horsepower output of a vehicle, and as simulation devices for simulating the inertia and road load forces to which a vehicle is normally subjected during actual operation of the vehicle. The present invention is concerned principally with the latter application.

Dynamometer systems, when used as simulators, typically comprise a mechanical device, such as a flywheel, for simulating the inertia for a vehicle, a power absorption unit (PAU) for simulating road load forces, and a system controller for controlling the force output of the PAU. The inertia of a vehicle is a function of the vehicle's weight and is the force which must be overcome for the vehicle to accelerate or decelerate. Road load forces on the other hand are those forces which must be overcome to maintain vehicle speed and include such factors as breakaway torque, rolling friction and windage.

The classic formula for calcuating the force output of a vehicle is:

$$F = (A + Bv + Cv^2) + I(dv/dt)$$

where:
v = velocity of the vehicle
I = vehicle weight and moment of inertia of its rotating parts
dv/dt = acceleration of the vehicle
A = load coefficient due to static friction; e.g. breakaway torque
B = load coefficient due to kinetic friction; e.g. rolling friction
C = load coefficient of the velocity squared; e.g. windage More simply, the above force equation can be expressed as:

$$F = RL + I(dv/dt)$$

where "RL" stands for "road load" forces and is equivalent to the expression "$A + Bv + Cv^2$."

Many conventional dynamometer systems simulate inertia force (I dv/dt) utilizing a combination of declutchable flywheels. These dynamometers simulate road load forces with a power absorption unit which typically comprises either a DC motor, an eddy current brake, or a hydrokinetic brake. Although flywheels provide good simulation of inertia forces in certain applications, substantial disadvantages are posed by their use in applications where flexibility, low cost, and accuracy of simulation are required. For example, the number of different inertia values that can be simulated by a given set of flywheels is limited. Moreover, a larger selection of inertia values can only be realized by increasing the number of flywheels, which in turn increases the cost and mechanical complexity of the system while decreasing system reliability due to the correspondingly large number of clutches required. In addition, flywheels add parasitic friction and windage losses to the dynamometer system which introduce an error factor into the road load simulation. Moreover, this error factor is difficult to compensate for because it varies each time a new flywheel combination is selected.

The above-noted problems with flywheels are substantially avoided by providing a dynamometer system that utilizes the power absorption unit to simulate both road load and inertia forces. Typically, this latter type of dynamometer system still uses one flywheel, but requires no mechanical clutches.

Most conventional dynamometer systems that use the PAU for both road load and inertia simulation utilize the F=RL+I dv/dt formula to calculate the force output to be simulated by the power absorption unit (PAU). Specifically, the appropriate constants for A, B, C and I are entered into the system controller and the velocity and acceleration values calculated from the information received from a speed sensor connected to the rollers being driven by the driving wheels of the vehicle.

The principal disadvantage with this approach is the inherent lag time of the system in responding to changes in acceleration. In particular, this method determines the inertia force to be simulated by first measuring vehicle acceleration, multiplying that acceleration value(s) by the inertia weight to be simulated, and then simulating the product as the inertia force. While this procedure produces accurate results during states of constant speed or acceleration, it fails to yield accurate inertia simulation while acceleration is changing. This inaccuracy can be explained when it is considered that: (1) acceleration is the result of applying force to a mass (inertia), and (2) force and inertia are the effect that precede acceleration. Therefore, a correct acceleration can only occur after the proper force and mass (inertia) have been established (not before). For this reason it is desirable to eliminate the use of acceleration as an input for calculating inertia force since the proper acceleration does not occur until the correct inertia force has been simulated. Rather, it is preferable that acceleration be treated as an output with force and inertia mass used as inputs. Of course, during constant accelerations it no longer matters if the above sequence is reversed since the acceleration that follows any given point in time is equal to the value that preceded it. However, until a steady state condition is achieved, a classical dynamometer will go into a state of search. In other words, for that brief period of time immediately following a change in acceleration the measured acceleration term in the above formula will be incorrect until the system "catches up". In actuality, the system corrects for changes in acceleration by performing a series of successive approximations until the appropriate PAU force is obtained. The length of this lag time varies from system to system, depending on the following conditions:

(1) PAU response time
(2) ratio of electric to mechanical inertia
(3) response time of accelerometer
(4) value of acceleration
(5) overall torque transducer and system controller response time, and can be as great as several seconds. This matter is typically complicated further by the additional lag time required to measure acceleration. Hence, the amount of time required to accumulate sufficient new data to calculate the appropriate new PAU force value is further increased.

To improve the response time of conventional dynamometer systems, another approach has been proposed which is principally distinguishable from the classic approach discussed above in that it measures the torque output of the vehicle—a more rapidly changing quantity—and from that calculates the velocity at which the PAU should be operating. This is accomplished simply by solving the force equation provided above for velocity which gives the following:

$$V = \frac{1}{I} \int_0^t (F_t - RL) dt$$

where $F_t$ is now the torque output of the vehicle as measured by a torque transducer. Although this approach succeeds in reducing the lag time associated with the original method discussed, it has two principal disadvantages. First, the torque transducer must be located as closely as possible to the driving wheels of the vehicle so that the torque signal produced by the transducer is truly representative of the force output of the vehicle. This typically entails placement of the torque transducer between the rollers and the flywheel, which is acceptable as long as the inertia of the rollers does not represent a significant percentage of the total inertia of the system. Secondly, the control quantity used for the PAU is speed rather than force. Since the PAU, which typically comprises an SCR-driven direct-current motor, is in reality a torque machine, the output of the PAU can best be controlled with a minimum of delay time by providing it with a torque input signal. A similar analogy can be drawn with an electrical heater. The proper temperature can be reached more rapidly by determining directly the amount of current to be supplied to the heater to produce the desired temperature output rather than by simply "telling" the heater the temperature level desired.

The present invention proposes a third method of dynamometer simulation control which utilizes both a measured force reading and a speed reading to calculate directly the desired force output of the power absorption unit (PAU). More particularly, the control system of the present invention recognizes that the force reading from a torque transducer not positioned directly at the true force output of the vehicle. The present system accordingly utilizes the following equation to determine the actual force output of the vehicle:

$$F = F_t + I_r(dv/dt)$$

where:
 $F_t$ = the force reading from the torque transducer,
 V = the measured roll surface speed, and
 $I_r$ = the mechanical inertia "outside" the torque transducer loop; (i.e., the inertia of the mechanical components between the driven wheels of the vehicle and the torque transducer.)

As a consequence, since the force outside the torque loop is being accounted for, the torque transducer is free to be placed between the flywheel and the d.c. motor (PAU) where the torque loads are less severe, thus permitting the use of a smaller more accurate transducer. The present system also permits the torque transducer to be placed next to the rollers or even directly on the vehicle itself without deterioration of simulation accuracy. It should be noted that none of the prior art systems previously described allow this flexibility.

From the above force equation, the present control system proceeds to calculate what the acceleration of the vehicle should be, given its total force output and its current speed, and then calculates the corresponding force output that should be assigned to the PAU to produce the theoretical acceleration. Simultaneously, the inertia within the torque loop is calculated and compared with the assigned loop inertia value to produce an error signal that is added to the designated PAU force value to correct any deviations.

Thus, it will be seen that the dynamometer control system of the present invention virtually eliminates the lag time problems associated with most prior art dynamometer control systems by providing a novel method of feedback control which produces an exact calculated value for the force output of the PAU. Moreover, the force output of the PAU in the present system is controlled directly rather than indirectly through control of its speed.

In addition, to further improve the precision of the system, the present invention includes a novel speed conditioning circuit which derives a highly accurate velocity signal from the output of the speed sensor without sacrificing system response time. More particularly, the speed conditioning circuit (1) counts the speed pulses received from the speed sensor within a predetermined minimum time period plus the first pulse received thereafter, (2) measures the exact time elapsed from the first pulse to the last pulse, and (3) divides the count total by the total elapsed time period. In this manner, the measured time period is not fixed at some arbitrary value but is varied in accordance with the rate at which speed pulses are received. Hence, it will be seen that the percentage error in the velocity signal is substantially reduced without significantly extending the length of the measured time period.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a system diagram of a dynamometer control system according to the present invention;

FIG. 2 is an electrical block diagram of the system controller of the present invention;

FIGS. 3a and 3b are a functional block diagram of the system controller of the present invention;

FIGS. 4a–4d are a circuit diagram of the logic and output stage block shown in the electrical block diagram in FIG. 2; and FIGS. 5a and 5b are a circuit diagram of the novel speed signal conditioning circuit shown in the electrical block diagram in FIG. 2.

DETAILED DESCRIPTION OF THE PREFERRED EMBODIMENT

Figure 3A:
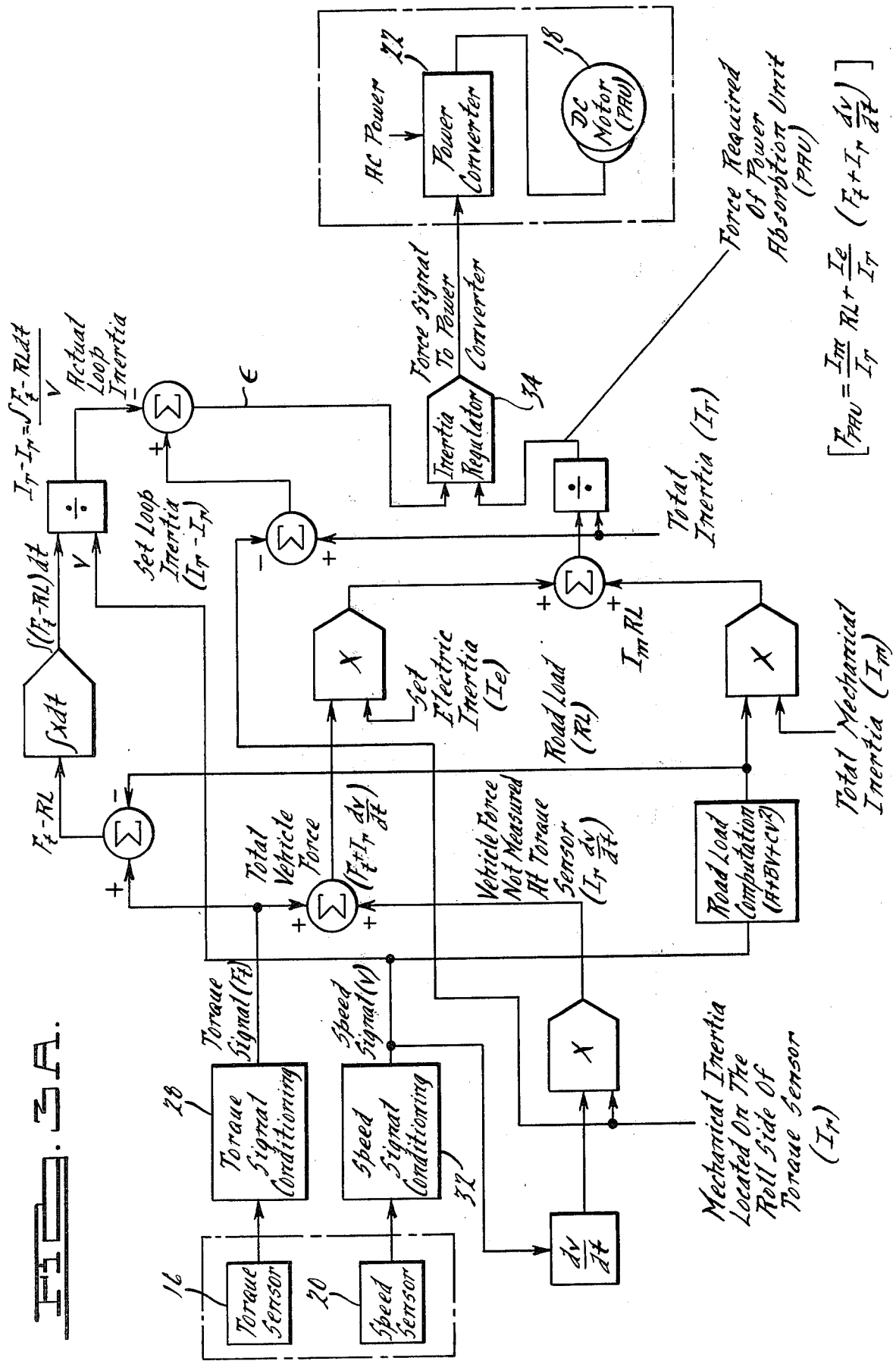

Referring to FIG. 1, a general system diagram of a dynamometer control system according to the present invention is shown. The dynamometer system 10 includes a roller assembly 12 which comprises a pair of longitudinal rollers adapted to be driven by the driving wheels of a vehicle. The roller assembly 12 is mechanically coupled via a shaft 15 to a flywheel 14 and a power absorption unit (PAU) 18 which in the preferred embodiment comprises a 75 HP, DC motor manufactured by General Electric. A torque transducer 16 disposed on the shaft 15 between the flywheel 14 and the DC motor 18 is adapted to produce a force output signal that is provided to a system controller 24. Similarly, a speed transducer 20 disposed on the end of shaft 15 is adapted to produce a velocity output signal that is also provided to the system controller 24. From the feedback information received from the torque transducer 16 and the speed transducer 20, the system controller 24 is adapted to calculate the desired force output of the PAU 18 and produce an appropriate output control signal which is provided to a power controller 22 which then regulates accordingly the amount of current supplied to the DC motor 18.

The system controller 24 in the preferred embodiment comprises a microprocessor-based control circuit that is adapted to calculate and control the inertia and road load forces simulated by the dynamometer system 10. In particular, the controller 24 of the present invention is adapted to determine the desired force output of the PAU 18 by calculating the total force output of the vehicle and then determining the theoretical acceleration of the vehicle given the force being outputted by the vehicle. Thus, it will be seen that the present system constitutes a significant improvement over most prior art systems which suffer from a lag time problem. In addition, control of the PAU 18 is accomplished directly by determining the total force to be outputted by the PAU 18.

As discussed previously, the dynamometer system is intended to simulate the inertia and road load forces to which a vehicle is subjected during normal operation. Inertia forces are directly related to the weight of the vehicle and are simulated in the dynamometer system by the combination of the mechanical inertia associated with the various rotating components in the system and the electrical inertia associated with the DC motor 18. Mechanical inertia (Im) is principally comprised of the inertia contributed by the flywheel, the roller assembly, and the mechanical inertia associated with the DC motor 18. This is a fixed characteristic of the dynamometer system and may, for example, equal 3700 lbs. Electrical inertia (Ie) is selectable and is preset by the operator so that the total inertia simulated by the dynamometer system will equal the weight of the vehicle tested. Thus, it will be appreciated that if the weight of the vehicle to be tested exceeds the total mechanical inertia of the dynamometer, electrical inertia must be set to the appropriate positive value to make up the difference. On the other hand, if the weight of the vehicle to be tested is less than the total mechanical inertia of the dynamometer, electrical inertia must be set to the appropriate negative value to account for the difference.

Road load forces, which include friction and windage, are related to the velocity of the vehicle and are simulated entirely by the PAU 18. The force or torque output of the PAU 18 is controlled by controlling the amount of armature current provided to the DC motor. Thus, it can be seen that the PAU 18 in the present invention simulates both electrical inertia and road load forces.

The classic formula as given above for determining the force output of a vehicle is:

$$F = A + Bv + Cv^2 + I(dv/dt); \text{ or}$$

$$F = RL + I(dv/dt)$$

where
  RL = road load forces = $A + Bv + Cv^2$
  V = rolling velocity
  I = inertia of the vehicle With the information provided by the torque transducer 16 and speed transducer 20, the force output of the vehicle can be measured and calculated according to the following formula:

$$F = F_t + I_r(dv/dt)$$

where
  $F_t$ = force output as measured by the torque transducer 16;*

*Frictional and windage parassitic losses are assumed to be zero in order to simplify this derivation. In actuality they are subtracted from the torque sensor signal when the signal is conditioned. (See the description of FIG. 3b.)

$I_r$ = mechanical inertia "outside" the torque loop; and
  V = rolling velocity as measured by the speed transducer 20.

It is important to note at this point that the force reading from the torque transducer 16 will not be equal to the force output of the vehicle, unless acceleration is zero. This is because the torque transducer 16 does not "see" the inertia of the flywheel 14 and roller assembly 12. In other words, in order for the torque transducer 16 to provide an accurate read-out of the total force output of the vehicle, the torque transducer would have to be located directly off the driving wheels of the vehicle, which is not feasible from a practical standpoint. Some dynamometer systems install the torque transducer between the flywheel and the rollers which does serve to bring the flywheel within the torque loop. However, the inertia of the rollers is still unaccounted for. In addition, the torque transducer, when placed on the roller side of the flywheel, is subjected to substantially higher torque loads, and therefore must be of a larger, less sensitive type. Thus, in the formula given immediately above, the value of $I_r$ is equal to the mechanical inertia of the components between the torque transducer 16 and the driving wheels of the vehicle, which in the preferred embodiment is equal to the inertia of the flywheel 14 and roller assembly 12.

Since by definition road load forces are the forces which must be overcome to maintain a given speed and inertia forces are the forces which must be overcome to accelerate, from the above equation we can determine the portion of the total force output of the vehicle available for acceleration by subtracting RL. Thus, the equation becomes:

$$F_a = F_t + I_r(dv/dt) - RL$$

where $F_a$ is the force output of the vehicle available for acceleration. With $F_a$ known, it is now possible to determine what the true acceleration of the vehicle should be, given its current speed and total force output. This is accomplished by dividing the equation given for $F_a$ by $I_T$, the total inertia. Hence, the theoretical acceleration of the vehicle, $a_t$, is given by:

$$a_t = (1/I_T)(F_t + I_r(dv/dt) - RL)$$

From this equation, the force output to be assigned to the PAU can be directly calculated. It will be recalled that the PAU simulates both electrical inertia $I_e$ and road load forces RL. Thus, the total force output of the PAU equals:

$$F_{PAU} = RL + I_e a_t$$

Substituting the equation given above for $a_t$ yields:

$$F_{PAU} = RL + \frac{I_e}{I_T}(F_t + I_r(dv/dt) - RL)$$

$$= \left(1 - \frac{I_e}{I_T}\right) RL + \frac{I_e}{I_T}(F_t + I_r\,dv/dt)$$

$$= \left(\frac{I_T - I_e}{I_T}\right) RL + \frac{I_e}{I_T}(F_t + I_r\,dv/dt)$$

$$= \frac{I_m}{I_T} RL + \frac{I_e}{I_T}(F_t + I_r\,dv/dt)$$

For convenience, the following summary of the designations used in the above equations is provided.
- v = roll surface velocity as measured by the speed sensor;
- $F_t$ = force measured by the torque transducer;
- $I_T$ = total inertia ($I_m + I_e$);
- $I_m$ = total mechanical inertia;
- $I_e$ = electrical inertia;
- $I_r$ = mechanical inertia outside the torque loop, (i.e., inertia of mechanical components between the torque sensor and the driving wheels of the vehicle);
- $RL = A + Bv + Cv^2$ = road load forces; and
- $a_t$ = theoretical vehicle acceleration.

The above outlined derivation of $F_{PAU}$ is performed by the system controller 24 of the present invention in the manner diagrammed in FIG. 3a. In particular, the output from the speed sensor 20 is converted to a speed signal by a novel speed signal conditioning circuit 32 to be subsequently described in greater detail. The speed signal (v) is then differentiated and multiplied by the value of $I_r$. As discussed previously, $I_r$ is the mechanical inertia outside the torque loop which is a fixed characteristic of the dynamometer system. In the preferred embodiment, $I_r$ would equal the inertia of the flywheel 14 and roller assembly 12.

The force reading from the torque sensor 16 is provided to a torque signal conditioning circuit 28 which converts the output from the torque sensor to a torque signal ($F_t$). The torque signal is added to the product of $I_r\,dv/dt$ and the resultant sum is then multiplied by the preset value for electrical inertia ($I_e$). This product is added to the product of the total mechanical inertia ($I_m$) and the road load forces (RL). Total mechanical inertia is also a fixed characteristic of the dynamometer system and the road load forces are calculated from the speed signal value (v) according to the formula, "$A + Bv + Cv^2$", where A, B and C are constant load coefficients. Total PAU force ($F_{PAU}$) is then obtained by dividing the entire equation by the total inertia ($I_T$) of the system, which is a preset value equal to the weight of the vehicle being tested.

To correct for deviations in the actual force output of the PAU 18 from the calculated value, an error factor ($\epsilon$) is added to the $F_{PAU}$ signal prior to application of the signal to the power converter 22. The error function ($\epsilon$) is calculated based upon a comparison of the actual loop inertia ($I_T - I_r$) being simulated and the desired loop inertia value which is preset in accordance with vehicle weight. Specifically, the actual loop inertia being simulated is determined by subtracting the road load computation (RL) from the torque signal value ($F_t$) produced by the torque sensor 16, integrating the difference, and then dividing the result by the speed signal value (v) from the speed sensor 20. The calculated loop inertia is then subtracted from the set loop inertia which is readily determined by subtracting the set value for $I_r$ (mechanical inertia located outside the torque loop) from the set value for $I_T$ (total inertia). The resulting error function ($\epsilon$) is provided along with the calculated $F_{PAU}$ value to an inertia regulator circuit 34 which is adapted to manipulate the calculated $F_{PAU}$ value before application to the power converter 22 so that the error function ($\epsilon$) is made to go to, and thereafter kept at, zero.

More particularly, with additional reference to FIG. 3b, the inertia regulator circuit 34 comprises a conventional three-mode regulator. Specifically, the calculated $F_{PAU}$ value is modified in a three-step manner: (1) the error function ($\epsilon$) is added directly to $F_{PAU}$, (2) the derivative of the error function ($d\epsilon/dt$) is added to $F_{PAU}$ to correct for immediate deviations, and (3) $F_{PAU}$ is multiplied by the integral of the error function $$\left( \int_o^t \epsilon\,dt \right)$$

to compensate for any "long term" deviation in the error function ($\epsilon$). Alternatively, the integral of the error function may simply be added to $F_{PAU}$. In addition, friction and windage compensation for parassitic losses occurring within the DC motor are accounted for by adding the additional factor "$\alpha + \beta v$" to calculated $F_{PAU}$ value. This latter factor is a further refinement of the regulator circuit and serves to "anticipate" the changes in the error function which result from changes in the rotational speed of the DC motor. The final compensated $F_{PAU}$ force signal is then provided to the power converter 22 which controls accordingly the armature current provided to the DC motor.

Turning now to FIG. 2, an electrical block diagram of the system controller 24 for the dynamometer system 10 of the present invention is shown. In general, the system controller 24 is adapted to calculate the desired force output of the PAU 18 from the feedback information received from the torque transducer 16 and the speed transducer 20 and produce an appropriate output control signal that is provided to the power controller 22 which then regulates accordingly the amount of current supplied to the DC motor (PAU) 18. The power controller 22 utilized in the preferred embodiment is manufactured by Control Systems Research, Inc., No. 4300 BP. The system controller 24 receives separate speed sensor signals V1 and V2 from two speed transducers connected to the two rollers 12a and 12b in the roller assembly 12. The speed sensors utilized in the preferred embodiment are manufactured by Litton Industries, No. 70LDIN250-0-1-1. As will be subsequently described in greater detail in connection with the description of FIGS. 5a and 5b, the V1 speed signal is utilized to represent the rolling velocity of the wheels in the calculations to determine the desired force output of the PAU 18. Because the other roller 12b is not connected to the PAU 18, the V2 speed signal is used only for display purposes to indicate the degree of slippage between the driving wheels of the vehicle and the active roller 12a.

The speed transducers produce output signals V1 and V2 whose frequencies are directly related to the speed of the two rollers 12a and 12b. The speed signals V1 and V2 are provided to a speed signal conditioning circuit 32 that is adapted to convert the V1 frequency signal to a corresponding parallel digital output signal 60 suitable for processing by a microprocessor 48. Additionally, the speed signal conditioning circuit 32 is adapted to convert the two speed signals V1 and V2 to corresponding analog signals 62 for driving a pair of analog meters 38. The analog speed signals on line 62 are also provided to the logic and output circuit 50 which utilizes the signals to produce acceleration and slippage signals for display on analog meters 38, and also to monitor the signals to insure that the signals satisfy various predefined operating characteristics. In addition, the speed signal conditioning circuit 32 is further adapted to produce a logic signal on line 61 that is HI when V1 is greater than zero and LO when V1 is equal to zero. This logic signal is also provided to the logic and output circuit 50, whose operation will be discussed in greater detail in connection with the description of the circuit diagram in FIGS. 4a and 4b.

The output signal $F_t$ from the torque transducer is similarly provided to a torque signal conditioning circuit 28 which converts the output signal to a corresponding digital signal 64 suitable for processing by the microprocessor 48. The torque signal conditioning circuit 28 also converts the low voltage output signal $F_t$ from the torque transducer to a $\pm 5$ volt analog signal 66 for driving an analog meter 38. The analog torque signal on line 66 is also provided to the logic and output circuit 50 which monitors the signal to insure that it stays within prescribed limits. (See the description of FIG. 4 below). The torque signal conditioning circuit 28 utilized in the preferred embodiment is manufactured by Daytronic Corp., No. 3174. In addition, the preferred torque sensor is manufactured by Lebow Co., No. 1605-5K.

The speed and torque output signals on lines 60 and 64 are interfaced with the microprocessor 48 via a plurality of conventional digital I/O ports 44. The microprocessor 48 is programmed to calculate the desired force output for the PAU 18 in the manner described above, utilizing the speed and torque signal information received from the speed and torque transducers. In addition, the values for the various road load and inertial constants in the $F_{PAU}$ formula provided above are entered by the operator via a keyboard 46 and provided to the microprocessor 48 through the digital I/O ports 44. The resulting PAU force output signal calculated by the microprocessor 48 is then provided on line 68 through the analog I/O ports 42 to the logic and output circuit 50 on line 70. The logic and output circuit 50 contains a portion of the inertia regulator 34 described above which in the preferred embodiment is implemented in part with hardware. In addition, the logic and output circuit preferably contains a logic switching circuit which pulls the regulator output signal on line 72 to zero to prevent reverse rotation of the DC motor whenever: (1) the velocity signal V1 is zero, and (2) the $F_{PAU}$ signal on line 70 is positive (indicating deceleration or braking). The resulting $F_{PAU}$ control signal is then provided on line 72 to the power controller 22 which is adapted to regulate the current supply to the PAU 18 accordingly.

Figure 5A:
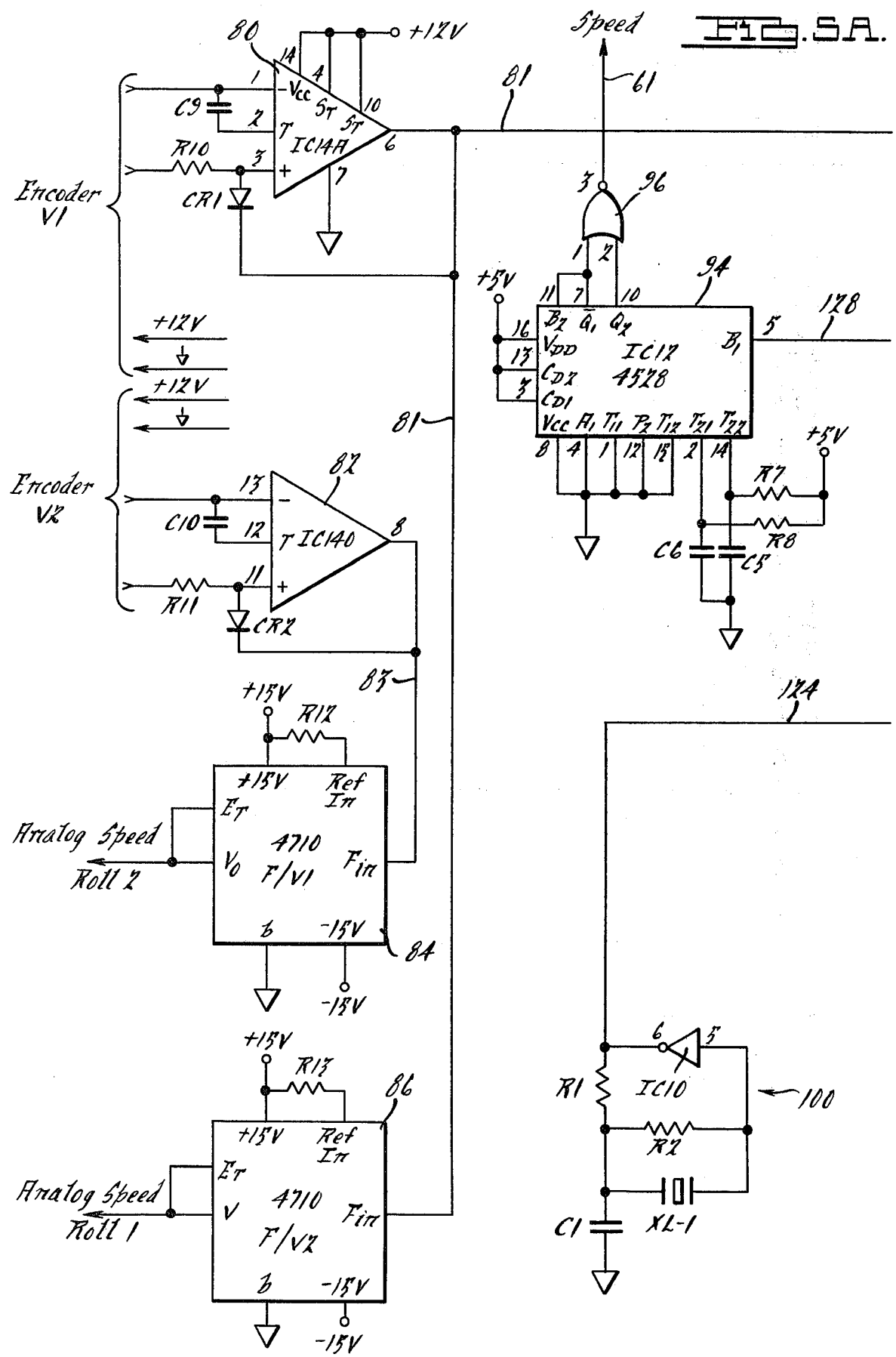

Looking now to FIGS. 5a and 5b, a detailed circuit diagram of the speed signal conditioning circuit 32 according to the present invention is shown. As noted previously, the principal purpose of the speed signal conditioning circuit 32 is to convert the frequency signal from the V1 speed sensor to a corresponding parallel digital signal suitable for processing by the microprocessor 48. In addition, both the V1 and V2 speed sensor signals are converted to corresponding analog signals for display purposes. In particular, the V1 and V2 encoder signals are initially provided to a pair of line receivers, 80 and 82 respectively, which serve to receive the signals with a minimum amount of distortion. The outputs on lines 81 and 83 are provided to frequency-to-analog conversion circuits 84 and 86, more commonly referred to as "tach circuits". Tach circuits 84 and 86 are adapted to convert the incoming speed sensor signals V1 and V2 to corresponding analog signals whose magnitudes are directly proportional to the frequencies of the speed sensor signals V1 and V2. The analog speed signals from the outputs of tach circuits 84 and 86 are then provided through the analog I/O ports 42 to a pair of analog meters to display the speed readings for the convenience of the operator.

The novel process for converting the V1 speed sensor signal to a corresponding parallel digital output signal will now be explained. Conventional speed signal conditioning circuits typically function by counting the pulses in the sensor signal that occur within a preselected time period and then dividing the total count by the length of that time period. This approach is satisfactory when the number of speed pulses received within the preselected time period is high; i.e., when the speed of the wheels is high. However, at low speeds, the percentage of error in the converted signal can become significant. The following simple example clearly illustrates this point. If three speed pulses are received within the preselected time period and a fourth pulse occurs almost immediately thereafter, the converted digital value will correspond to a three-pulse speed when in actuality a four-pulse speed would represent a more accurate approximation. Thus, it can be seen that the percentage error in the converted signal is equal to the period between speed pulses divided by the preselected or measured time period. Therefore, in an effort to minimize the percentage error in the signal, most prior art systems lengthen the measured time period. The disadvantage of this approach, however, is that it has the effect of slowing the response time of the entire system. Thus, it will be appreciated that there typically exists a trade-off in most prior art systems between low-speed accuracy and system response time.

The present invention solves this problem by providing a conversion process which significantly increases the accuracy of the converted speed signal without materially effecting the response time of the system. This is accomplished in the following manner. The present invention counts the number of speed pulses received within a predetermined time period, which in the preferred embodiment is selected to be 16 milliseconds, plus the first pulse received thereafter, and then divides the total count by the entire elapsed time period; i.e., 16 msec. plus the additional elapsed time until the appearance of the first speed pulse following the 16 msec. period.

Returning to the circuit diagram, the implementation of this conversion scheme will now be explained. The V1 speed sensor signal on line 81 is provided to a Schmitt trigger circuit 88 which acts as a wave shaper to "square-up" the speed pulses from the output of line receiver 80. The square-wave signal from the Schmitt trigger 88 is then provided to the clock input (CK) of a D-type flip-flop 90. The data input (D) of flip-flop 90 is tied directly to a +5 volt source and the inverted output ($\overline{Q}$) of the flip-flop is provided to the enable input (EN) of an 8-bit counter 104. Thus, it will be appreciated that each time a speed pulse is received at the clock input (CK) of flip-flop 90, a count pulse is produced at the $\overline{Q}$ output of flip-flop 90, which increments the 8-bit "distance" counter 104. Accordingly, it can be seen that the 8-bit distance counter maintains a "running" count of the total number of speed pulses received since the beginning of the current measured time period, which as will be described shortly, is initiated by the production of a reset signal on line 120.

The timing function is monitored utilizing a 1 MHz crystal oscillator 100 whose output is provided to the enable input (EN) of another 8-bit counter 108. The MSB output (pin 14) of counter 108 is also tied to the enable input (EN) of a third 8-bit counter 106, thereby creating a 16-bit "time" counter. Thus, it can be seen that the 16-bit time counter, comprised of 8-bit counter 108 and 8-bit counter 106, maintains a "running" count of the total number of clock pulses produced on line 124 during the measured time period.

Given the frequency of the clock signal produced on line 124, the second most significant bit in the 16-bit time counter, which corresponds to pin 13 of 8-bit counter 106, will go HI 16 milliseconds into the measured time period. The 16 msec. signal on line 122 is provided through an inverter 118 to the set terminal (S) of another D-type flip-flop 102. The data input (D) of flip-flop 102 is connected through an inverter 92 to the Q output of flip-flop 90 and the clock input (CK) of flip-flop 102 is tied to the clock signal line 124. The inverted output ($\overline{Q}$) of flip-flop 102 is connected via line 120 to the reset terminals (R) of each of the 8-bit counters 104, 106 and 108, as well as to the latch inputs (CP) of the three 8-bit latches 110, 112 and 114, which are tied to the outputs of counters 104, 106 and 108.

Since the signal on line 122 is normally LO, the signal through inverter 118 to the set terminal (S) of flip-flop 102 is normally HI. Accordingly, it can be seen that flip-flop 102 is maintained in its set condition with its $\overline{Q}$ output LO during the measured time period. However, after 16 msec. have elapsed into the measured time period, the signal on line 122 goes HI, thereby removing the set signal from flip-flop 102. Consequently, when the next speed pulse appears at the Q output of flip-flop 90, the signal on line 128 provided to the data input (D) of flip-flop 102 will go LO. The LO signal at the data input (D) of flip-flop 102 will almost immediately get clocked through to its output upon receipt of the next clock pulse on line 124. When this occurs, the $\overline{Q}$ output of flip-flop 102 will go HI, thereby resetting the counters 104–108 and latching the accumulated count totals into the latches 110–114. Accordingly, it can be seen that the reset signal produced on line 120 serves to terminate one measured time period and initiate another.

To insure that the circuit does not get "hung up" waiting for the receipt of a speed pulse following the 16 msec. period in the event that the velocity of the wheels decreases to zero, the MSB output (pin 14 of counter 106) of the time counter is connected to the clear terminal (CL) of flip-flop 102, which is effective to produce a "back-up" reset signal on line 120 32 msec. into the measured time period. More particularly, the MSB output of the time counter will go HI after 32 msec. if a HI pulse has not already been produced on line 120 to reset the counters 104–108. In such an event, the HI signal on line 126 will clear flip-flop 102 and set the $\overline{Q}$ output of flip-flop 102 HI to thereby reset the counters 104–108.

In addition, it will be noted that the Q output signal from flip-flop 90 on line 128 is also provided to a multivibrator circuit 94 comprised of a pair of one-shot devices. In particular, the two one-shots are combined by tying the $\overline{Q}_1$ output (pin 7) from the first one-shot to the $B_2$ input (pin 11) of the second one-shot. The $\overline{Q}_1$ output from the first one-shot and the $Q_2$ output from the second one-shot are also provided to the inputs of a NOR-gate 96 which produces a logic signal on line 61 that is provided to the logic and output circuit 50 to be subsequently described. Specifically, the time period of the multivibrator circuit 94 is selected so that the output signal on line 61 from NOR-gate 96 will remain HI as long as the frequency of the input signal on line 128 is greater than zero i.e., as long as the velocity signal V1 is greater than zero. However, if no speed pulses are received within a prescribed time period established by the value of resistors R7 and R8 and capacitors C5 and C6, indicating that the velocity signal V1 is essentially zero, then the output signal on line 61 will go LO. This logic signal, as previously noted, is provided to the logic and output circuit 50 which is adapted to zero the $F_{PAU}$ output control signal to the power controller to prevent reverse rotation of the PAU whenever the logic signal on line 61 is LO and the calculated $F_{PAU}$ output signal from the microprocessor is positive (indicating deceleration).

Figure 4D:
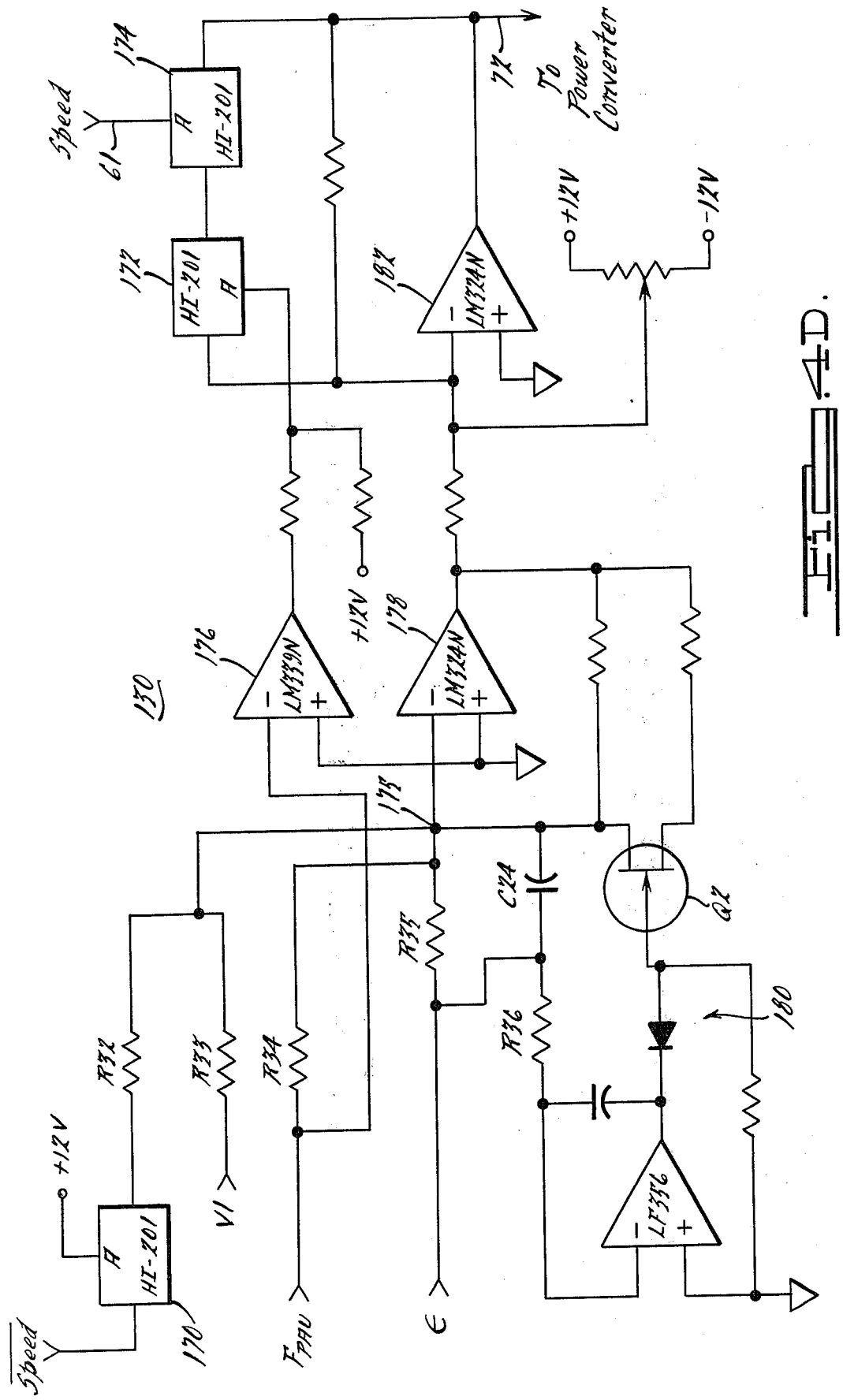

Turning now to FIGS. 4a–4d, the logic and output circuit 50 essentially comprises four sections: an output section which includes the inertia regulator circuitry 130 (FIG. 4d), a display driver section 132 (FIGS. 4b and 4c), an alarm and emergency stop section 134 (FIG. 4b), and a mode selection section 136 (FIG. 4a). Mode selection for the present dynamometer system includes the following four modes of operation: (1) vehicle simulation, (2) manual control for calibration purposes, (3) coast down, and (4) self-calibration. The various operating modes are conventional and need not be discussed in further detail. Selection by the operator of one of the four operating modes is made by activating one of the mode select switches 137 which is acknowledged by the appropriate indicator lamp 138. The selection is then entered into the microprocessor 48 via select lines 140 and also controls the application of power to the power controller 22 via lines 142. The three accessory switches 144 provided are connected to the roller assembly 12 and serve to control the following three functions: (1) "lift", which raises the spacer between the rollers to permit the vehicle to be driven off the rollers; (2) "brake", to hold the rollers from turning; and (3) "link", which mechanically engages the two rollers together.

The alarm and emergency stop section 134 of the circuit monitors the output signals from the torque sensor and speed sensor to insure that the signals remain within reasonably defined limits. In particular, the analog torque signal on line 66 from the torque signal conditioning circuit 28 is provided to a pair of comparators 148 and 150 which monitor the maximum positive and negative limits of the torque signal. In the event the torque signal exceeds one of the limits established by comparators 148 and 150, an alarm signal on line 160 is generated. Additionally, the two analog speed signals V1 and V2 are provided to a difference amplifier 152 which produces an output signal proportional to the amount of deviation between the two signals; i.e., the degree of slippage between the wheels of the vehicle and the active roller 12a (V1). The difference signal from the output of amplifier 152 is provided to two additional limit comparators 154 and 156 which are also adapted to generate an alarm signal on line 160 if the absolute value of the difference signal exceeds a prescribed value. Lastly, the V1 speed signal is provided to another limit comparator 158 which monitors the speed signal to insure that it does not exceed a predetermined maximum speed. The alarm and emergency stop section 134 also includes a manually operable emergency stop switch 164 and a manually operable alarm switch 166. Activation of the emergency stop switch 164 generates a $-12$ volt "stop" signal on buss 142 which is applied to the power converter and is effective to cause maximum braking torque to be applied to the PAU. Activation of the alarm switch 166 energizes an alarm oscillator 168 which produces a cyclic alarm signal on line 160.

The display driver section 132 is conventional and serves to properly scale the various signals for display on analog meters 38. Specifically, the V1 speed signal is displayed on meter 38a and the slippage signal produced at the output of difference amplifier 152 is displayed on meter 38c. In addition, the V1 speed signal is provided to a differentiator circuit 162 which is adapted to differentiate the V1 speed signal to determine the rate of acceleration. The resulting acceleration signal is displayed on meter 38b.

With particular reference to FIG. 4d, the output section 130 as noted includes the inertia regulator circuitry diagrammed functionally in FIG. 3b. Specifically, it can be seen that the $F_{PAU}$ output signal from the microprocessor is provided to summing junction 175 through resistor R34 and the inertia error signal ($\epsilon$) is provided to summing junction 175 through resistor R35. In addition, the rate control function of the error signal ($d\epsilon/dt$) is added to summing junction 157 through capacitor C24. The "$\alpha + \beta v_1$" expression is supplied to summing junction 175 by resistors R32 and R33 which serve as the "$\alpha$" and "$\beta$" coefficients, respectively. The CMOS switch 170 serves to eliminate the "$\alpha$" component whenever the rolling speed is zero.

The combined signals supplied to summing junction 175 are provided to the negative input of an inverting amplifier 178 whose gain is controlled by the integral control of the error function $$\left( \int_0^t \epsilon \, dt \right).$$

In particular, the error function signal ($\epsilon$) is provided through resistor R36 to an integrator circuit 180. The output of the integrator 180 is tied to the gate of a FET Q2 which in turn controls the gain of amplifier 178 to effect long term gain correction. The final error compensated $F_{PAU}$ control signal produced at the output of inverting amplifier 178 is provided through a summing amplifier 182 to the power converter.

As previously discussed, the logic and output circuit 50 is also adapted to prevent reverse rotation of the PAU by zeroing the $F_{PAU}$ control signal on line 72 to the power converter whenever the rolling speed signal is zero and the calculated $F_{PAU}$ output signal from the microprocessor calls for further deceleration or braking (i.e., is positive). This is accomplished by applying the $F_{PAU}$ signal to the negative input of a comparator amplifier 176 which has its positive input tied to ground. Whenever the $F_{PAU}$ signal goes positive, a LO signal is produced at the output of amplifier 176 which is effective to render CMOS switch 172 conductive. CMOS switch 172 is connected in series with another CMOS switch 174 and the series pair is in turn connected across amplifier 182. CMOS switch 174 has its control terminal (A) tied to the logic SPEED signal on line 61 so that CMOS switch 174 will be rendered conductive whenever the logic SPEED signal on line 61 goes LO, indicating that the rolling speed signal V1 is zero. Whenever both CMOS switches 172 and 174 are conductive at the same time, amplifier 182 is effectively shorted out of the circuit and the control signal on line 72 to the power converter is pulled to zero.

While the above description constitutes the preferred embodiment of the present invention, it will be appreciated that the invention is susceptible to modification, variation and change without departing from the proper scope or fair meaning of the accompanying claims.

What is claimed is:

1. In a dynamometer system for simulating road load and inertia forces for testing vehicles in place including at least one roller adapted for driving engagement with the driving wheels of a vehicle, a power absorption unit (PAU) coupled to said roller for simulating road load and inertia forces to which the vehicle would be subjected during normal operation, a torque transducer coupled to the roller and PAU assembly for producing a force signal, and a speed transducer coupled to the roller and PAU assembly for producing a speed signal; the improvement comprising: control means for controlling the total force output simulated by the PAU including, first means for determining the total force output of the vehicle, second means for determining the theoretical acceleration of the vehicle given its total force output and its current speed, third means for determining the force to be simulated by said PAU so that the vehicle can achieve said theoretical acceleration and producing a force output control signal in accordance therewith, and output means for controlling the force output of said PAU in accordance with said force output control signal.

2. The dynamometer system of claim 1 wherein said first means determines the total force output of the vehicle by adding to the force signal from said torque transducer the product of the inertia between the torque transducer and the driving wheels of the vehicle and the acceleration of said roller.

3. The dynamometer system of claim 1 further including fourth means for determining the actual inertia being simulated by said PAU, comparing said actual inertia with a preselected value and producing an error signal in accordance therewith, and modifying said force output control signal in accordance with said error signal.

4. In a dynamometer system for simulating road load and inertia forces for testing vehicles in place including at least one roller adapted for driving engagement with the driving wheels of a vehicle having associated therewith a given inertia value ($I_T$), a flywheel coupled to said roller for mechanically simulating at least a portion of the total inertia ($I_T$) associated with the vehicle, a power absorption unit (PAU) coupled to the roller and flywheel for simulating both road load forces and the balance of the total inertia ($I_T$) not simulated mechanically, and a torque transducer and a speed transducer coupled to the roller, flywheel and PAU assembly for producing a force signal and a speed signal respectively; the improvement comprising:

control means for producing a force output control signal for controlling the total force output simulated by the PAU, including error compensation means for determining the actual loop inertia being simulated on the PAU side of the torque transducer, comparing it with a preselected loop inertia value, and modifying said force output control signal in accordance with the result of the comparison.

5. The dynanometer system of claim 4 wherein said error compensation means determines the actual loop inertia being simulated in accordance with the force signal from said torque sensor and the speed signal from said speed sensor.

6. The dynamometer system of claim 4 wherein said preselected loop inertia value is established in accordance with the weight of the vehicle and the mechanical inertia associated with the components in said assembly outside of the torque loop.

7. In a dynamometer system for testing vehicles in place including a power absorption unit (PAU) for simulating road load and inertia forces and control means for producing a force output control signal for controlling the total force output being simulated by said PAU; the improvement comprising means for comparing the actual inertia being simulated with a preselected inertia value and modifying said force output control signal in accordance with the difference therebetween.

8. In a dynamometer system for simulating road load and inertia forces for testing vehicles in place including at least one roller adapted for driving engagement with the driving wheels of a vehicle, a power absorption unit (PAU) coupled to said roller for simulating road load and inertia forces to which the vehicle would be subjected during normal operation, a torque transducer coupled to the roller and PAU assembly for producing a force signal ($F_t$), and a speed transducer coupled to the roller and PAU assembly for producing a speed signal (V); the improvement comprising:

control means for controlling the total force output simulated by the PAU including means for determining the total force output (F) of the vehicle by adding to said force signal ($F_t$) the product of the mechanical inertia ($I_r$) of the dynamometer system between the torque transducer and the driving wheels of the vehicle and the acceleration (dv/dt) of the roller and means for determining the force to be simulated by said PAU in accordance with the total force output (F) of the vehicle and said speed signal and producing a force output control signal in accordance therewith, and output means for controlling the force output of said PAU in accordance with said force output control signal.

9. The dynamometer system of claim 8 wherein said control means further includes means for comparing the actual inertia being simulated with a preselected inertia value and modifying said force output control signal in accordance with the difference therebetween.

10. In a dynamometer system for simulating road load and inertia forces for testing vehicles in place including at least one roller adapted for driving engagement with the driving wheels of a vehicle, a power absorption unit (PAU) coupled with said roller for simulating road load and inertia forces, a torque transducer coupled to the roller and PAU assembly for producing a force signal ($F_t$) and a speed transducer for producing a speed signal (V); the method of controlling the force simulated by the PAU including the steps of:

determining the total force output (F) of the vehicle by adding to said force signal the product of the acceleration (dv/dt) of the roller and the mechanical inertia ($I_r$) of the dynamometer system between the torque transducer and the driving wheels of the vehicle, determining the force to be simulated by said PAU in accordance with the total force output (F) of the vehicle and said speed signal and producing a force output control signal in accordance therewith, and controlling the force output of said PAU in accordance with said force output control signal.

11. The method of claim 10 further including the steps of comparing the actual inertia being simulated with a preselected inertia value and modifying said force output control signal in accordance with the difference therebetween.

12. In a dynamometer system for testing vehicles in place including a power absorption unit (PAU) for simulating road load and inertia forces and control means for producing a force output control signal for controlling the total force output simulated by said PAU; the method of regulating said force output control signal including the steps of:

determining the actual inertia being simulated;

comparing said actual inertia with a preselected desired inertia value and producing an error signal proportional to the difference therebetween, and modifying said force output control signal in accordance with said error signal.

13. In a dynamometer system for testing vehicles in place including a power absorption unit (PAU), a speed transducer for producing a frequency speed signal, and control means for controlling the force output simulated by said PAU in accordance with said speed signal; the improvement comprising conversion means for converting said frequency speed signal to a digital speed signal including:

counting means connected to receive said frequency speed signal for counting the number of speed pulses received within a predetermined time period plus the first speed pulse received after said predetermined time period and producing an output signal representative of the total count, and timing means for timing said predetermined time period plus the additional elapsed time until receipt by said counting means of said first speed pulse and producing an output signal in accordance with the total elapsed time period.

14. In a dynamometer system for testing vehicles in place including a power absorption unit (PAU), a speed transducer for producing a frequency speed signal, and control means for controlling the force output simulated by said PAU in accordance with said speed signal; the method of converting said frequency speed signal to a digital speed signal including the steps of:

counting the number of speed pulses received within a predetermined time period plus the first speed pulse received after said predetermined time period and producing an output signal representative of the total count, and timing said predetermined time period plus the additional elapsed time until the appearance of said first speed pulse and producing an output signal in accordance with the total elapsed time period.

* * * * *

UNITED STATES PATENT AND TRADEMARK OFFICE
CERTIFICATE OF CORRECTION

PATENT NO. : 4,327,578
DATED : May 4, 1982
INVENTOR(S) : Severino D'Angelo

It is certified that error appears in the above—identified patent and that said Letters Patent is hereby corrected as shown below:

Column 3, line 13, "$V = \frac{1}{I} \int_{o}^{t} (F_t - RL)dt$" should be

--$V = \frac{1}{I} \int_{o}^{t} (F_t - RL)dt$--.

*Signed and Sealed this*

*Fourteenth* Day of *September 1982*

[SEAL]

*Attest:*

*Attesting Officer*

GERALD J. MOSSINGHOFF

*Commissioner of Patents and Trademarks*